(12) United States Patent
Xu et al.

(10) Patent No.: US 7,742,650 B2
(45) Date of Patent: Jun. 22, 2010

(54) OBJECT DETECTION IN IMAGES

(75) Inventors: Li-Qun Xu, Ipswich (GB); Jose-Luis Landabaso, Barcelona (ES)

(73) Assignee: British Telecommunications plc, London (GB)

( * ) Notice: Subject to any disclaimer, the term of this patent is extended or adjusted under 35 U.S.C. 154(b) by 642 days.

(21) Appl. No.: 10/577,736

(22) PCT Filed: Nov. 8, 2004

(86) PCT No.: PCT/GB2004/046585

§ 371 (c)(1), (2), (4) Date: May 2, 2006

(87) PCT Pub. No.: WO2005/048191

PCT Pub. Date: May 26, 2005

(65) Prior Publication Data

US 2007/0036432 A1    Feb. 15, 2007

(30) Foreign Application Priority Data

Nov. 12, 2003  (GB) ................................. 0326374.6

(51) Int. Cl.
  G06K 9/42  (2006.01)
  G06K 9/44  (2006.01)
  G06K 9/40  (2006.01)
  G06K 9/34  (2006.01)

(52) U.S. Cl. ....................... 382/257; 382/265; 382/173; 382/275; 382/180

(58) Field of Classification Search .................. 382/173, 382/181, 174, 190
  See application file for complete search history.

(56) References Cited

U.S. PATENT DOCUMENTS 6,167,167 A * 12/2000 Matsugu et al. ............. 382/283

FOREIGN PATENT DOCUMENTS

EP    1320060 A1    6/2003

OTHER PUBLICATIONS

Porikli et al., Human Body Tracking by Adaptive Background Models and Mean-Shift Analysis, IEEE International Workshop on Performance Evaluation of Tracking and Surveillance, Mar. 2003 (PETS-ICVS 2003), pp. 1-9.*

(Continued)

*Primary Examiner*—Tom Y Lu
*Assistant Examiner*—Thomas A Conway
(74) *Attorney, Agent, or Firm*—Nixon & Vanderhye PC

(57) ABSTRACT

A segmentation operation is applied to an input image to identify foreground objects of interest, and then a shadow removal operation is applied to remove any detected shadows from the foreground segmentation. The shadow removal algorithms can leave holes and bisections in the segmentation map, however, which will then subsequently impact on an object detection step performed using connected component analysis. To get around this problem, a conditional morphological dilation operation is applied to the segmentation map to 'grow' the segmented blobs to fill in any holes and bisections, without re-growing shadow pixels in the segmentation. The result is an object detection method and system which is robust to illumination changes causing shadows and/or highlights.

5 Claims, 5 Drawing Sheets

OTHER PUBLICATIONS

Sifakis et al., Video Segmentation Using Fast Marching and Region Growing Algorithms, EURASIPJournal on Applied Signal Processing 2002:4, Hindawi Publishing Corporation, pp. 379-388.*

Yoshitaka et al., Region-Growing Based Feature Extraction Algorithm for Tree-Like Objects, Visualization in Biomedical Computing, Springer Berlin/Heidelberg, vol. 1131/1996, copyright 1996, pp. 159-171.*

International Search Report dated Apr. 11, 2005.

GB Search Report dated Apr. 27, 2004.

Horpraset et al., "A Statistical Approach for Real-Time Robust Background Subtraction and Shadow Detection", IEEE, ICCV '99, Frame-Rate Workshop, 1999.

McKenna et al., "Tracking Groups of People", Computer Vision and Image Understanding, Academic Press, San Diego, CA, US, vol. 80, No. 1, Oct. 2000, pp. 42-56, XP004439258.

Javed et al., "Tracking and Object Classification for Automated Surveillance", Lecture Notes in Computer Science, Springer Verlag, New York, NY, US, vol. 2353, 2002, pp. 343-357, XP002310656.

Haritaoglu et al., W<4>: Who? When? Where? What? A real time System for Detecting and Tracking People:, Automatic Face and Gesture Recognition, 1998, Proceedings. Third IEEE International Conference on Nara, Japan, Apr. 14-16, 1998, Los Alamitos, CA, USA, IEEE Comput.Soc. US, Apr. 14, 1998, pp. 222-227, XP010277655.

Prati et al., "Comparative Evaluation of Moving Shadow Detection Algorithms", Proceedings of $3^{rd}$ Workshop on Empirical Evaluation in Computer Vision, Dec. 10, 2001, pp. 1-18, XP002323906.

Jahne, Digital Image Processing:Chapter 18: Morphology, pp. 481-494, 2002, Springer, XP002324015.

Haritaoglu et al., "$W^4$: Real-Time Surveillance of People and Their Activities", IEEE Transactions on Pattern Analysis and Machine Intelligence, vol. 22, No. 8, Aug. 2000.

Zhou et al., "Tracking and Classifying Moving Objects from Video", Computer and Vision Research Center, Department of Electrical and Computer Engineering, The University of Texas at Austin, circa 2001.

Jahnd et al., "A Hierarchical Approach to Robust Background Subtraction Using Color and Gradient Information", pp. 1-6, Computer Vision Lab, School of Electrical Engineering and Computer Science, University of Central Florida, circa 2002.

Jabri et al., Detection and Location of People in Video Images Using Adaptive Fusion of Color and Edge Information, Department of Computer Science, George Mason University, Fairfax, Virginia, circa 1999.

Stauffer et al., "Learning Patterns of Activity Using Real-Time Tracking", Artificial Intelligence Laboratory, Massachusetts Institute of Technology, Cambridge, MA 02139, pp. 1-17, circa 1999.

Elgammal et al., "Background and Foreground Modeling Using Nonparametric Kernel Density Estimation for Visual Surveillance", Proceedings of the IEEE, vol. 90, No. 7, Jul. 2002, p. 1151-1163.

Horpresert et al, A Statistical Approach for Real-Time Robust Background Subtraction and Shadow Detection, Computer Vision Laboratory, University of Maryland, College Park, MD 20742, pp. 1-19, circa 1999.

Xu et al., Segmentation and Tracking of Multiple Moving Objects for Intelligent Video Analysis, BT Technology Journal, vol. 22, No. 3, Jul. 2004, pp. 140-150.

* cited by examiner

OBJECT DETECTION IN IMAGES

This application is the US national phase of international application PCT/GB2004/004685 filed 8 Nov. 2004 which designated the U.S. and claims benefit of GB 0326374.6, dated 12 Nov. 2003, the entire content of which is hereby incorporated by reference.

BACKGROUND

1. Technical Field

The present invention relates to a method and system for detecting objects in images, and particularly, but not exclusively, to a method and system which detects moving objects taking into account lighting shadows and highlights of those objects.

2. Related Art

The automatic detection of moving objects such as people or vehicles within video images of a scene has been a goal of many researchers, and is a precursor to the provision of automated classification or tracking applications. Additionally, automated object detection systems are in themselves of use for monitoring and detection applications. The actual step of discriminating between picture elements (pixels) within an image which represent foreground or moving objects of interest and the background scene is known generally within the art and herein as "segmentation".

One of the problems known in the art relating to the automated detection of objects is of how to compensate for changes in lighting conditions, and in particular of how to discern between an actual object, and a shadow or highlight that that object may cast or otherwise contain. Especially within object classification or tracking systems, the need to be reasonably certain that it is the object which has been detected and not its shadow is important for subsequent matching steps, and hence techniques have been proposed in the art which detect and remove segmented pixels caused by shadows and highlights.

More particularly, McKenna et al. in "Tracking Groups of People", *Computer Vision and Image Understanding*, 80, 42-56, 2000 describe a pixel segmentation technique wherein an adaptive background image is employed, which recursively adapts a background image to take into account changes in illumination (which are assumed to be slow compared to object movement). A colour channel background subtraction technique is then performed, wherein for any particular input image, the RGB channels of the input image pixels are compared with the adaptive background, and dependent on the results of a logical comparison of the respective input and background R, G, or B values a pixel is set as either "foreground" or "background". The map of "foreground" pixels constitutes a mask which is then used subsequently for further processing.

Due to it having been generated using a colour-difference background subtraction technique the mask of foreground pixels contains pixels which represent object shadows and/or highlights. Therefore, McKenna et al. also describe a second pixel segmentation technique wherein shadows are detected using pixel gradient and chrominance information. More particularly, and as described in Horpraset et al. "A Statistical Approach for Real-time Robust Background Subtraction and Shadow Detection" *IEEE ICCV'99 FRAME_RATE workshop*, it is known that shadows exhibit a colour constancy property in that the chromaticity of a pixel which is in shadow does not significantly differ from the chromaticity of that same pixel when it is not in shadow. Instead, the only change lies in the luminance of the pixel. This colour constancy is therefore used as a first discriminator by McKenna et al in that they assume that any pixel with a significant intensity change in comparison with the background, but without a significant chromaticity change could have been caused by a shadow.

However, McKenna et al. also note that the above colour constancy discriminator fails when a foreground object is the same chromaticity as the background e.g. when black trousers cross a grey footpath. Therefore, McKenna et al. also describe using pixel gradient information of the input and background images to perform a comparison there between, on the basis that if an input pixel is a shadow pixel, then its texture information should not have changed much from its background value. A pixel is thus flagged as foreground if either chromaticity or gradient information supports that classification.

Having performed pixel segmentation using the above technique, McKenna et al then perform a connected component analysis to identify connected objects. They note that due to the chromaticity and gradient discrimination a connected object may contain "holes", in that pixels wholly located within the boundaries of the connected pixels and which should have been segmented as foreground are erroneously segmented as background, and hence not part of the connected object. To remedy this, reference is made to the "mask" produced by the RGB subtraction method described earlier, in that each "background" pixel which is part of a hole in a connected object is set to foreground if the mask from the RGB subtraction indicates that it is foreground. Thus the holes within the connected objects may be removed, and foreground and background segmentation performed which takes into account shadows.

Whilst the colour constancy and gradient techniques described by McKenna et al. are effective at identifying shadows for the purposes of a foreground-background pixel segmentation, the technique described by McKenna et al presents some problems when used in real situations due to the connected component analysis being performed before taking into account the "holes" due to the segmentation. For example, if the "holes" due to the segmentation actually overlap and completely bisect an object, then the connected component analysis will not recognise the two blobs as a single object, but instead as two separate objects. As a consequence, overlapping "holes" will not be recognised as such, and hence cannot be filled in by reference to the RGB subtraction mask. Conversely, until the connected component analysis is performed the "holes" themselves are not identified, and hence filled. The result of this paradox is that in some situations two smaller connected objects may be identified where in reality only one object exists.

BRIEF SUMMARY

In a first aspect the present invention presents an image processing method for detecting objects within an input image, the image being composed of picture elements, the method comprising:

a) segmenting picture elements representing a foreground object within the input image from those picture elements forming the image background using a first segmentation technique, wherein the picture elements segmented as foreground include elements representing a shadow or highlight of the object; and b) segmenting picture elements which have the characteristics of a shadow or highlight of an object from those picture elements representing the foreground object using at least one other segmentation technique adapted to detect shadows and/ or highlights;

the method being characterised by further comprising the steps of:— c) segmenting as foreground surrounding picture elements to those picture elements which are already segmented as foreground;

d) repeating step c) until picture elements which were not segmented as foreground after step a) would be or are segmented as foreground; and then.

e) detecting as objects groups of adjacent picture elements which have been segmented as foreground.

By performing the additional segmenting step c) before the detection of any objects using a connected component analysis or the like then any artefacts such as holes, bisections or the like in a group of adjacent segmented pixels representing an object which have arisen due to the shadow removal processing can be compensated for by removal. In effect, the segmenting step c) is a morphological dilation operation which "grows" the skeleton blobs remaining after the shadow removal processing operation such that the blobs are merged back into one blob (in the case of a bisection), or any holes in the blob filled prior to the object detection step. The overall effect of the invention is thus to ensure that when the object detection step is performed then a single object will be detected for each object in the scene, but that any shadows or highlights in the object will not affect the object detection. The object detection technique of the invention is therefore robust to illumination changes causing shadows.

In a preferred embodiment of the invention the segmenting step a) preferably further comprises:

for each picture element of the input image which is to be segmented as foreground, validating the foreground segmentation by comparison of the picture element with probability models relating to surrounding picture elements, wherein the foreground segmentation is confirmed if at least half of the models indicate that the picture element is foreground. This helps to prevent "false foreground" segmentation of pixels, which may be caused by noise in the input image, or by the image capture means such as a camera being unstable.

From a second aspect the present invention also provides a computer program or suite of programs arranged such that when executed on a computer system the program or suite of programs causes the computer system to perform the method of the first aspect. Moreover, from a further aspect there is also provided a computer readable storage medium storing a computer program or suite of programs according to the third aspect. The computer readable storage medium may be any suitable data storage device or medium known in the art, such as, as a non-limiting example, any of a magnetic disk, DVD, solid state memory, optical disc, magneto-optical disc, or the like.

From a fourth aspect, the present invention also provides an image processing system for detecting objects within an input image, the image being composed of picture elements, the system comprising:— image processing means arranged to receive an input image to be processed, and to apply the following image processing operations thereto:— a) to segment picture elements representing a foreground or moving object within the input image from those picture elements forming the image background using a first segmentation technique adapted to detect differences in the input image from a general background image, wherein the picture elements segmented as foreground include elements representing a shadow or highlight of the object;

b) to segment picture elements which have the characteristics of a shadow or highlight of an object from those picture elements representing the foreground object using at least one other segmentation technique adapted to detect shadows and/or highlights;

and being characterised by further applying the following operations:— c) to repeatedly segment as foreground surrounding picture elements to those picture elements already segmented as foreground until picture elements which were not segmented as foreground after step a) would be or are segmented as foreground; and then e) to detect as objects groups of adjacent picture elements which have been segmented as foreground.

Within the fourth aspect the same advantages, and same further features and advantages are obtained as previously described in respect of the first aspect.

Embodiments of the present invention improve upon the prior art discussed above by providing an improved pixel segmentation technique which accounts for "holes" left in the segmentation due to the shadow processing prior to performing a connected component analysis to identify connected objects. This is achieved by applying a foreground segmentation technique as is known in the art to give a "mask" for the boundary of any segmented blobs (a "blob" being a group of adjacent segmented pixels), and applying shadow processing techniques similar to those described by McKenna et al. to identify shadows and highlights in the input image. As also mentioned by McKenna et al. the shadow processing results in "skeleton" segmented blobs being left, which blobs may contain holes, be reduced in size, or even bisected in comparison to the blobs obtained from the background subtraction. Before applying connected component analysis to the blobs to find connected objects a morphological dilation operation is applied to the skeleton blobs to dilate the pixels therein, the dilation operation being repeatedly applied so as to reconstruct the skeleton blobs until the re-constructed blobs touch the respective boundary of the mask of the corresponding blob (located at the substantially same position in the image as the blob or blobs being re-constructed) obtained from the background subtraction. By "growing" the blobs using a morphological dilation operation then any holes or bisections in the "skeleton" blobs obtained from the shadow processing can generally be filled in to give a re-constructed blob, before connected component analysis is performed to identify the blob as an object. Moreover, by conditionally performing the dilation operation for any blob only until the respective blob mask from the background subtraction step is touched or just overlapped, it can be assured that shadows will not be included in the re-constructed blob, because shadows are generally extended areas of the original object shape along a certain direction.

BRIEF DESCRIPTION OF THE DRAWINGS

Further features and advantages of the present invention will become apparent from the following description of an exemplary embodiment thereof, presented by way of example only, and by reference to the accompanying drawings, wherein.

DETAILED DESCRIPTION OF EXEMPLARY EMBODIMENTS

An exemplary embodiment of the present invention will now be described with respect to the figures, and an example of the operation of the embodiment given.

Figure 1:
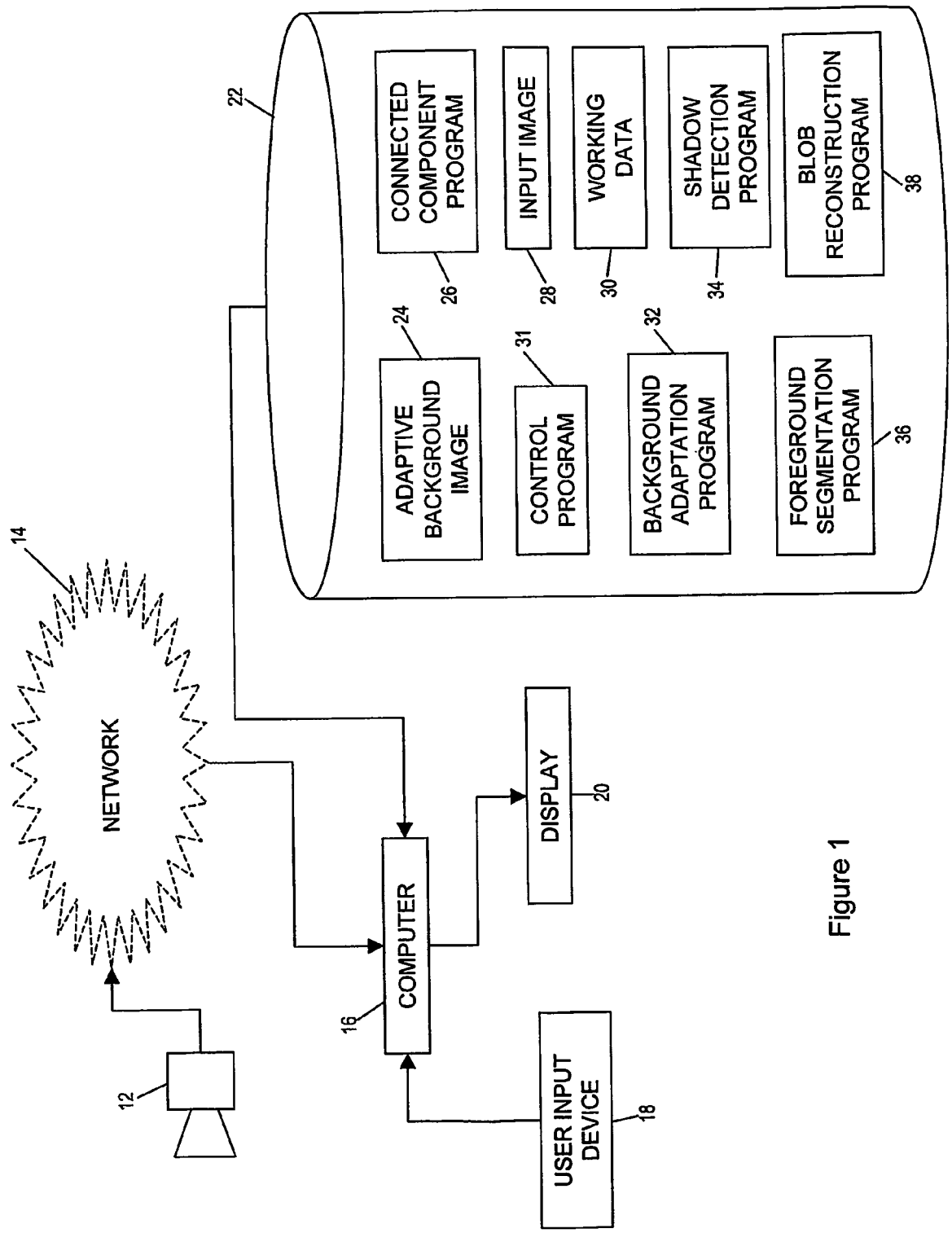
FIG. 1 is a schematic block diagram of a system according to the embodiment of the present invention.

FIG. 1 illustrates an example system architecture which provides the embodiment of the invention. More particularly, as the present invention generally relates to an image processing technique for detecting objects within input images, the invention is primarily embodied as software to be run on a computer. Therefore, the system architecture of the present invention comprises a general purpose computer 16, as is well known in the art. The computer 16 is provided with a display 20 on which output images generated by the computer may be displayed to a user, and is further provided with various user input devices 18, such as keyboards, mice, or the like. The general purpose computer 16 is also provided with a data storage medium 22 such as a hard disk, memory, optical disk, or the like, upon which is stored programs and data.

More specifically, on the data storage medium 22 are stored data 24 corresponding to an adaptive background image, data 28 corresponding to an input image, and data 30 corresponding to working data such as image data, segmentation maps, or the like used as intermediate storage during the operation of the invention. Additionally stored on the data storage medium 22 is executable program code in the form of programs such as the control program 31, a background adaptation program 32, a foreground segmentation program 36, a connected component program 26, a shadow detection program 34, and a blob reconstruction program 38. The operation of each of these programs will be described in turn later.

The computer 16 is arranged to receive images from an image capture device 12, such as a camera or the like. The image capture device 12 may be connected directly to the computer 16, or alternatively may be logically connected to the computer 16 via a network 14 such as the Internet. The image capture device 12 is arranged to provide sequential video images of a scene in which objects are to be detected, the video images being composed of picture elements (pixels) which take particular values so as to have particular luminance and chrominance characteristics. The colour model used for the pixels output from the image capture device 12 may be any known in the art e.g. RGB, YUV, etc.

In operation, the general purpose computer 16 receives images from the image capture device 12 via the network, or directly, and then runs the various programs stored on the data storage medium 22 so as to process the received input image in order to detect objects therein. A more detailed description of the operation of the embodiment will now be undertaken with respect to FIG. 2.

Figure 2:
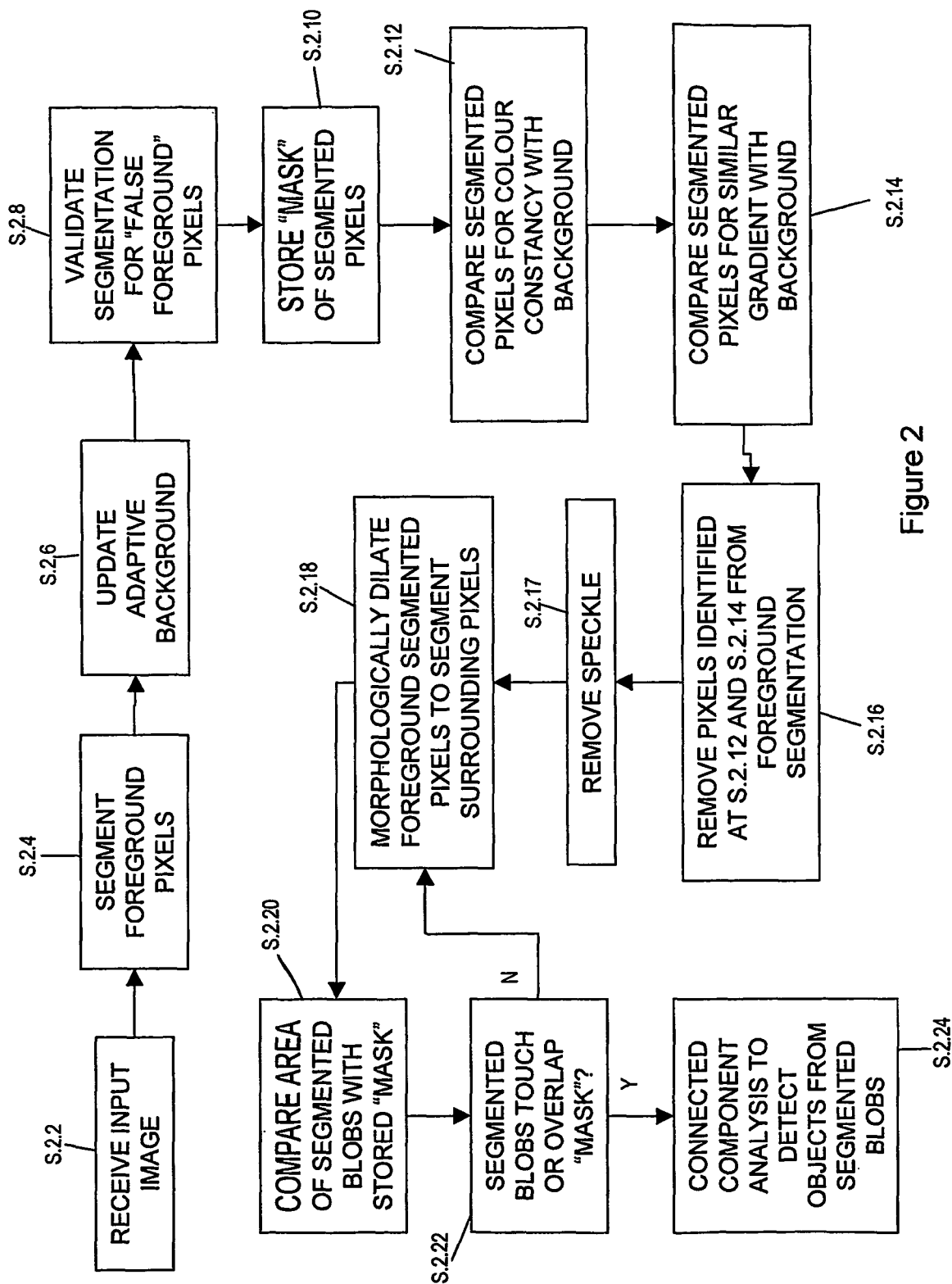
FIG. 2 is a flow diagram illustrating the steps performed by the embodiment of the present invention.

FIG. 2 illustrates a flow diagram of the operation of the embodiment of the invention. Starting at step 2.2, here the general purpose computer 16 receives an input image to be analysed using the invention from the image from the image capture device 12, either via the network 14, or directly. The embodiment of the invention then acts to analyse the contents of the received input image so as to detect foreground objects of interest therein. Within this embodiment, foreground objects are taken to be moving objects, or other objects of interest. The process of detecting foreground objects relies on effectively segmenting (i.e. distinguishing) the pixels representing the foreground objects from pixels representing the background of the scene in the image, and then performing a connected component analysis on the segmented foreground images in order to characterise them as objects.

The general purpose computer operates to process the received image under the control of the control program 31. That is, the control program 31 controls the order of processing to be applied to received input images, and runs the other programs to perform their respective processing operations in turn, passing input data to them and receiving processed data from them as appropriate. In view of this, the first processing to be performed once the input image has been received is to perform a segmentation of those images that do not belong to the background scene. Within the present embodiment the adaptive background subtraction method proposed by Stauffer and Grimson in "Learning Patterns of Activity Using Real Time Tracking", *IEEE Trans on Pattern Analysis And Machine Intelligence,* 22(8), August 2000 was adopted. Here, a mixture of K Gaussian distributions is used to model the colour changes, at each pixel location, in the imaged scene over time. With each incoming frame the Gaussian distributions are updated, and then used to determine which pixels are most likely to result from a background process. This model allows a proper representation of the background scene undergoing slow lighting and scene changes, but not momentary variations such as swaying trees or flags in the wind.

Figure 6:
FIG. 6 is an example input image with a shadow highlighted which may be used as input to the embodiment of the present invention.
Figure 5:
FIG. 5 is an example adapted background image used in an embodiment of the present invention.

In view of the above, within the present embodiment at step 2.4 foreground pixels are segmented from the input image 28, using the Stauffer and Grimson technique, and at step 2.6 the adaptive background image 24 is updated to take into account the received input image, and the updated image stored in the data storage medium 22. Full details of the necessary procedures to undertake step 2.4 are described in Stauffer and Grimson, ibid. sections 3.1 and 3.2. Regarding step 2.6, the background pixels are obtained as follows: the pixel colours in the background image assume those of the incoming image if they are classified as background at step 2.4. In the case that the incoming pixels have been classified as foreground, then the mean of the Gaussian distribution with the largest weight at the lowest variance (the most probable background colour in the pixel) is chosen as the background pixel colour. As a result an updated background image can be obtained for every incoming frame. Within the embodiment the segmentation step 2.4 is performed by the foreground segmentation program 36, and the background adaptation step 2.6 is performed by the background adaptation program 32, both under the control of the control program 31. An example background image from the sequence of input images used to generate the example images shown herein is shown in FIG. 5. An example input image with the shadow cast by an object circled is shown in FIG. 6.

Figure 8:
FIG. 8 is a segmentation mask image generated by a first segmentation technique applied to FIG. 7 within the embodiment.
Figure 7:
FIG. 7 is an example video image used as input to the embodiment of the present invention in an example.

The result of the segmentation performed at step 2.4 is that a map of segmented pixels is obtained, as shown in FIG. 8, for the example input image depicted in FIG. 7. The foreground pixels thus obtained, however, are not exempt from false detections due to noise in the background or from a shaking camera. Hence, at step 2.8 a false foreground pixel suppression procedure is introduced to alleviate this problem. Here, when a pixel is initially classified by the segmentation performed at step 2.6 as a foreground pixel, its eight connected neighbouring pixels models are examined. If the majority of these models, when applied to this pixel, agree that it is a background pixel, then it is considered as a false detection, and removed from the foreground segmentation. This "false foreground" test is applied to every pixel which was segmented at step 2.4 using the Stauffer and Grimson technique, and hence the segmentation as foreground for each of these pixels is validated.

Following the "false foreground" validation, the map of segmented pixels as shown for example in FIG. 8 is stored at step 2.10, for use as a "mask" of segmented pixels later in the process. This map of segmented pixels is stored in the working data area 30 of the data storage medium 22.

Figures 3, 4:
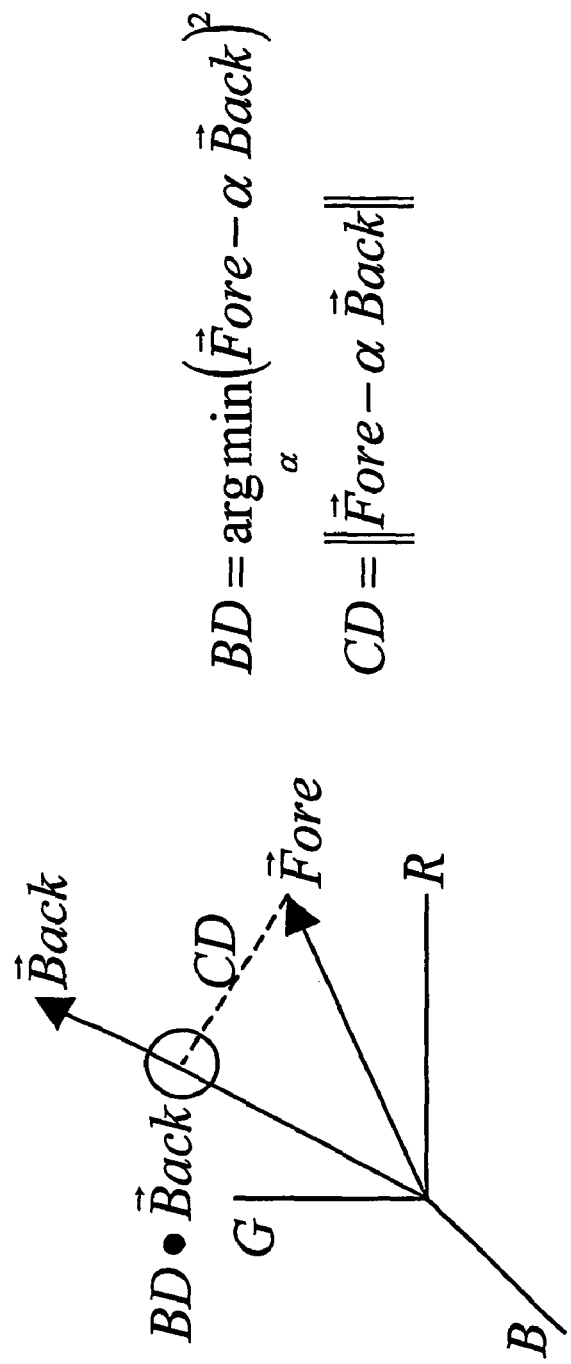
FIG. 3 is a vector diagram illustrating the principal of colour constancy used in the embodiment of the present invention.
FIG. 4 is a map of a morphological operator used in the embodiment of the present invention.

Once the foreground pixels have been identified, a further detection technique is applied to find out if some of these foreground pixels correspond to regions likely to be cast shadows or highlights. As explained in Horprasert et al "A Statistical Approach for Real Time Robust Background Subtraction and Shadow Detection", *ICCV'99 FRAME RATE workshop* at section 4.2, a pixel can be considered a shadow pixel if it has similar chromaticity to, but lower brightness than, those of the same pixel in the background image, or can be considered as a highlight pixel if it has similar chromaticity but higher brightness than the corresponding pixel in the background image. This characteristic of shadow or highlight pixels is referred to as "colour constancy" in that the chromaticity of the shadow or highlight pixels in an input image is similar to or identical to the corresponding pixel in the background image, with the only difference being in the luminance of the input image pixels. Therefore, as a first step in detecting shadows and/or highlights at step 2.12 the colour distortion ("CD"), and brightness distortion ("BD") is calculated as described by Horprasert et al and as shown in FIG. 3 herein, between respective foreground pixels and the corresponding pixels of the adaptive background image stored at step 2.6, and possible shadows are detected. More particularly, at step 2.12 aggressive thresholds are used for the colour and brightness distortion, and in particular the following logical conditions are applied:—

IF $CD<10$ THEN

IF $0.5<BD<1.0$->SHADOW

IF $1.0<BD<1.25$->HIGHLIGHT

ELSE FOREGROUND

In other embodiments of the invention the thresholds may differ from those given above; the precise values of the thresholds should be found by calibration of any particular implementation.

Those segmented pixels which are identified as either shadow or highlight pixels by the above logical conditions are then marked for removal from the foreground segmentation map. Note that in the embodiment the above steps are performed by the shadow detection program 34, under the control of the control program 31.

Although the above colour constancy test is effective in detecting shadows, it was observed that the procedure was less effective in cases where the objects of interest have similar colours to that of presumed shadows. To correct this, a second process comparing the gradients/textures of the regions of the segmented pixels is also used, in a similar manner to that described by McKenna et al at section 3.2 of their paper "Tracking Groups of People", referenced above. More particularly, at step 2.14 within the embodiment of the invention the shadow detection program 34 acts to calculate the spatial gradients of those pixels of the input image which are marked as segmented according to the present segmentation map, and then compares the calculated gradients with correspondingly calculated gradients of the respective corresponding pixels from the adaptive background, as described in detail by McKenna et al in section 3.2 of their paper. The segmented pixels of the input image which are found to have a similar gradient to the adaptive background are then marked as candidates for removal from the foreground segmentation map.

The result of the operations of the steps 2.12 and step 2.14 are that both shadow and highlight pixels are marked for removal from the segmentation map, but at this stage no segmented pixels have yet been removed from the segmentation map. At step 2.16, therefore, the shadow detection program 34 identifies those pixels which were identified at both steps 2.12 and 2.14 as being candidates for shadow or highlight pixels, and removes those pixels from the segmentation map. As a consequence, those pixels which exhibited both colour and gradient similarity with the background are detected as shadows or highlights, and removed from the object segmentation.

As an aside, although within the preferred embodiment a pixel is only removed from the segmentation at step 2.16 if it was marked as a potential shadow/highlight pixel by both steps 2.12 and 2.14, in alternative embodiments this need not be the case, and a pixel may be removed from segmentation if either one or the other, or both, of the tests performed at steps 2.12 and 2.14 indicates the pixel to be a shadow/highlight pixel. This may result in even more pixels being identified as shadow/highlight pixels and being removed from the foreground segmentation than in the preferred embodiment where both tests must be met.

Figure 9:
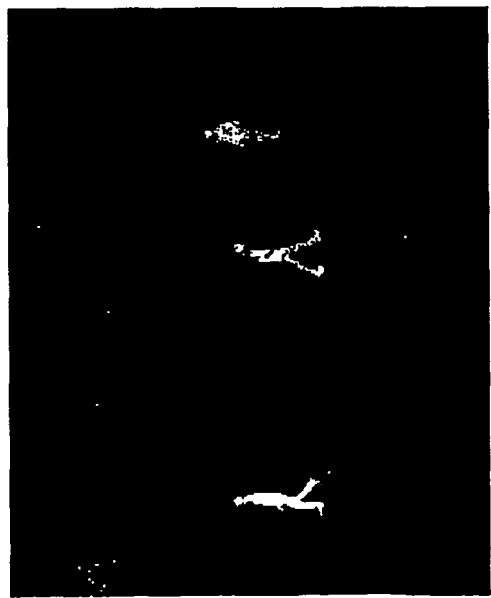
FIG. 9 is a segmentation map resulting from the removal of shadows and highlights by the embodiment.

Returning to the main embodiment, because of the aggressive application of the shadow removal techniques (due to the thresholds chosen for the logical conditions) it will also be found that many segmented pixels which properly represent the objects of interest will also have been removed from the segmentation map. An example segmentation map produced by the application of steps 2.12 to 2.16 is shown in FIG. 9 from where it will be seen, with comparison to the corresponding FIG. 8 which illustrates the segmentation map prior to the performance of the steps, that the segmented pixels representing the objects of interest are much reduced, and exhibit both holes and bisections within and of the group of segmented pixels representing the objects. However, it should also be noted that the segmented pixels which represent shadow pixels, which are very prominent in FIG. 8, have been completely removed within FIG. 9.

As will be seen from FIG. 9, however, the map of segmented pixels stored at step 2.16 contains a speckle of erroneously segmented pixels therein, and hence at step 2.17 speckle noise removal on the segmentation map is performed in order to suppress isolated noisy foreground pixels. This speckle noise removal technique is performed using a morphological operator as shown in Equation 1:

$$\tilde{M} = M \cap (M \oplus N) \qquad \text{Equation 1}$$

where N is the structuring element shown in FIG. 4. From FIG. 4, it will be seen that N is a 3×3 structuring element comprising the four-connected neighbours of the origin, but that the origin is not included. Additionally, the term $(M \oplus N)$ in equation 1 identifies all the pixels that are four-connected to, i.e. next to, a pixel of M. Hence, M̃ identifies all the pixels that are in M and also have a four-connected neighbour and, therefore, these points correspond to all the points in M except the isolated ones. The resulting speckle free segmentation map resulting from this speckle filtering step is then stored in the working data area 30 of the storage medium 22.

If a connected component analysis to find objects were to be performed on the blobs of FIG. 9 following shadow removal, then due to the various holes and bisections within the groups of pixels various erroneous objects would be detected. Therefore, the embodiment of the invention provides that the various holes and bisections in the segmented blobs of pixels are removed and this is performed at step 2.18 by the repeated application of a morphological dilation operation to the segmented pixels in the segmentation map, to segment surrounding pixels to the presently segmented pixels. This morphological dilation operation is repeatedly performed until the segmented blobs touch or just overlap the boundary of the corresponding respective blob of segmented pixels produced from the segmentation at step 2.4 (i.e. FIG. 8), whereupon the dilation operation is then stopped. The effect of this is to "grow" the segmented blobs left over after the shadow removal process so as to fill in any holes or bisections within the blobs of segmented pixels.

More specifically, at step 2.18, a dilation operation using a 9×9 block structuring element (with each block of the element being set to "1") is performed on the foreground segmented pixels of the segmentation map corresponding to FIG. 9 by the blob reconstruction program 38 to segment surrounding pixels to the already segmented pixels as foreground pixels. Then, at step 2.20, the area of segmented blobs in the segmentation map thus obtained is compared with the segmented blobs within the stored mask, being the segmentation map obtained from the segmentation step of step 2.4, i.e. the Stauffer and Grimson segmentation. At step 2.22, an evaluation is performed to determine whether any of the segmented blobs obtained as a result of the morphological dilation touch or overlap the segmented blobs of the mask segmentation map. If this evaluation determines that there is no touching or overlapping of the mask segmentation blobs, then processing returns in a loop to the morphological dilation step 2.18 which is performed again. The loop comprising the steps 2.18, 2.20, and 2.22 is repeatedly performed until the evaluation of step 2.22 returns positive, in which case the loop is then ended. Formally, therefore, segmented blobs within the segmentation map are reconstructed according to Equation 2:

$$R = M_s \cap (\tilde{M} \oplus SE) \qquad \text{Equation 2}$$

where $M_s$ the mask image obtained from the segmentation of step 2.10, M̃ the segmented pixels after the shadow/highlight removal steps of s.2.12 to 2.16, and SE the structuring element whose size usually depends on the size of the objects; as mentioned above a 9×9 square element proved to work well in all our tests, but other size structuring elements which result in a dilation may be used. The underlying idea of this morphological dilation step is that the shadow removed blobs keep at least a number of points that have been robust to wrong shadow removal. These robust points are appropriate for leading the reconstruction of neighbouring points as long as they form part of the silhouette in the original blob obtained from the segmentation of step 2.4.

Figure 10:
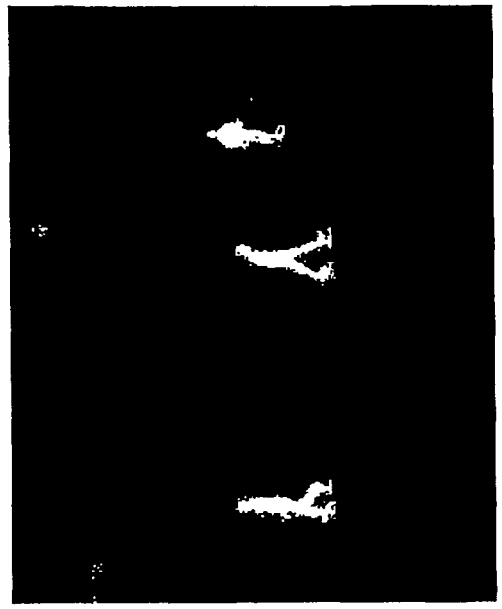
FIG. 10 is a segmentation map corresponding to the image of FIG. 7 after the morphological dilation operation of the invention has been applied.

The resulting segmentation map output by the blob reconstruction program 38 once the processing loop has ended should resemble the example shown in FIG. 10 from which it will be seen when compared to FIG. 9 that the segmented pixel blobs have been reconstructed, and any holes or bisections therein have been removed. It will also be seen, moreover, that the reconstructed segmented pixel blobs of FIG. 10 do not contain any substantial shadow pixels within the segmentation. The segmented pixel blobs thus obtained in FIG. 10 can therefore be used as input to a classical eight connectivity connected component analysis algorithm to link all the pixels presumably belonging to one object into a detected object, respectively. Thus, at step 2.24 a connected component analysis is performed on the segmentation map obtained from the processing loop by the connected component program 26, in order to detect objects from the segmented blobs contained within the segmentation map. Data identifying the detected objects is then stored within the working data area 30 of the storage medium 22, and may be used subsequently as an input to an object classification application, an object tracking application, or the like. Alternatively, the embodiment of the invention may be used on its own solely to detect objects, and to display the objects on the display 20 to a user.

In other embodiments, a further action may be performed if one or more objects are detected in the input image, such as, for example, the computer 16 causing an output device to give an audio or visual indication of the detection of an object to a user. The embodiment of the invention is therefore particularly suitable for use in monitoring applications and the like.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. An image processing method for detecting objects within an input image, the image being composed of picture elements, the method comprising:
    a) segmenting picture elements representing a foreground object within the input image from those picture elements forming the image background using a first segmentation technique, wherein the picture elements segmented as foreground include elements representing a shadow or highlight of the object;
    b) storing a segmentation mask, containing the location of the segmented picture elements representing a foreground object, in a data store;
    c) segmenting picture elements which have the characteristics of a shadow or highlight of an object from those picture elements representing the foreground object using at least one other segmentation technique adapted to detect shadows or highlights;
    d) segmenting as foreground surrounding picture elements to those picture elements which are already segmented as foreground by performing a morphological dilation operation;
    e) comparing the surrounding picture element segmented as foreground in step d) against the stored segmentation mask;
    f) repeating steps d) and e) if comparison determines that the segmented surrounding picture elements do not touch the boundary of the foreground object in the stored segmentation mask; and
    g) if the comparison determines that the segmented surrounding picture elements touch the boundary of the foreground object in the stored segmentation mask, then detecting as objects, groups of adjacent picture elements which have been segmented as foreground.

2. An image processing method as claimed in claim 1, wherein the segmenting step a) further comprises:

for each picture element of the input image which is to be segmented as foreground, validating the foreground segmentation by comparison of the picture element with probability models relating to surrounding picture elements, wherein the foreground segmentation is confirmed if at least half of the models indicate that the picture element is foreground.

3. A non-transitory computer-readable storage medium containing a computer program or suite of computer programs arranged such that, when executed by a computer, they control the computer to perform the method of claim 1.

4. An image processing system for detecting objects within an input image, the image being composed of picture elements, the system comprising:
- a data store;
- an image processor arranged to receive an input image to be processed, and to apply the following image processing operations thereto:
  a) to segment picture elements representing a foreground or moving object within the input image from those picture elements forming the image background using a first segmentation technique adapted to detect differences in the input image from a general background image, wherein the picture elements segmented as foreground include elements representing a shadow or highlight of the object;
  b) to store a segmentation mask, containing the location of the segmented picture elements representing a foreground object in the data store;
  c) to segment picture elements which have the characteristics of a shadow or highlight of an object from those picture elements representing the foreground object using at least one other segmentation technique adapted to detect shadows or highlights;
  d) to repeatedly segment as foreground surrounding picture elements to those picture elements already segmented as foreground using a morphological dilation operation
  e) to compare the surrounding picture elements segmented as foreground in step d) against the stored segmentation mask;
  f) to stop the morphological dilation operation if the comparison determines that segmented surrounding picture elements touch the boundary of the foreground object in the stored segmentation mask; and then
  g) to detect as objects, groups of adjacent picture elements which have been segmented as foreground.

5. An image processing system as claimed in claim 4, wherein the image processing means is further arranged, for each picture element of the input image which is to be segmented as foreground as a consequence of the segmentation a), to validate the foreground segmentation by comparison of the picture element with probability models relating to surrounding picture elements, wherein the foreground segmentation is confirmed if at least half of the models indicate that the picture element is foreground.

* * * * *